Dec. 5, 1933.　　　　R. L. BACHER　　　　1,938,446
CHOCKING DEVICE FOR VEHICLE LIFTS
Filed Aug. 19, 1930　　2 Sheets-Sheet 1
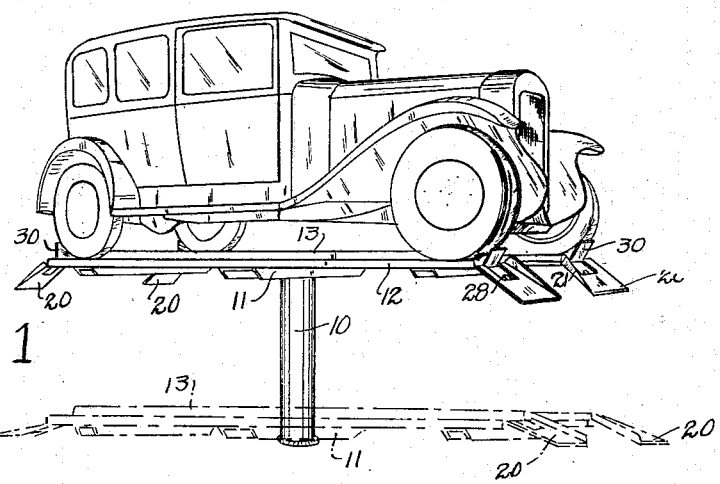
Fig.—1
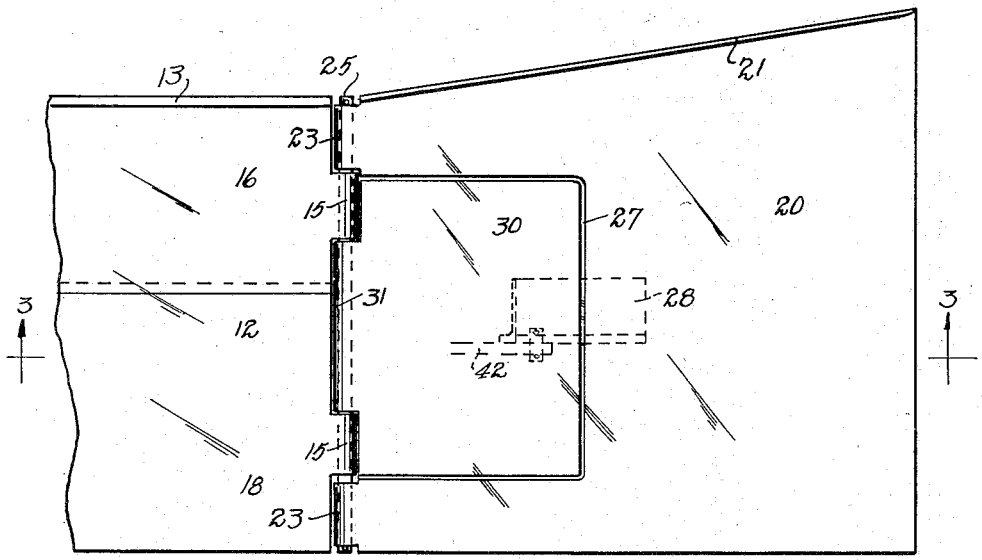
Fig.—2
Inventor
Rollin L. Bacher,
By Bates, Goldrick & Fears
Attorneys Dec. 5, 1933.     R. L. BACHER     1,938,446
CHOCKING DEVICE FOR VEHICLE LIFTS
Filed Aug. 19, 1930     2 Sheets-Sheet 2
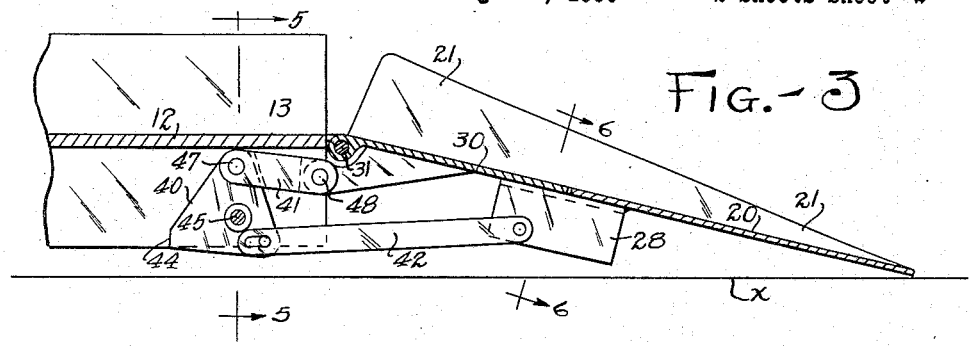
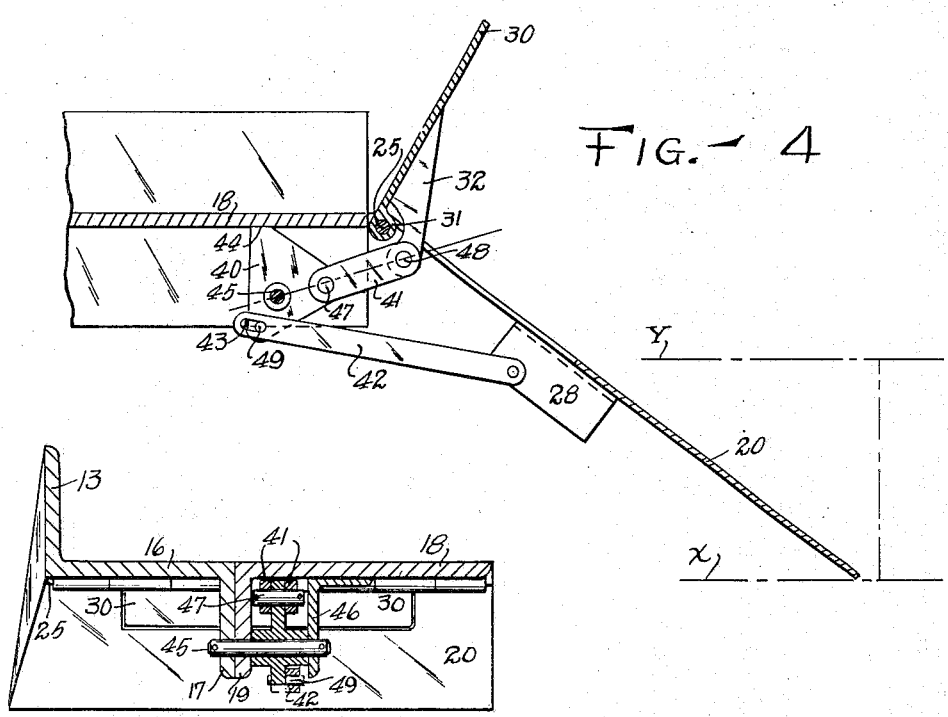
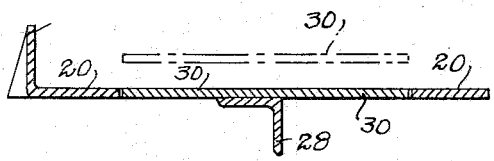
Inventor
Rollin L. Bacher,
By Bates Golrick & Team
Attorneys Patented Dec. 5, 1933

1,938,446

UNITED STATES PATENT OFFICE 1,938,446

CHOCKING DEVICE FOR VEHICLE LIFTS

Rollin L. Bacher, Lakewood, Ohio, assignor to The United States Air Compressor Company, Cleveland, Ohio, a corporation of Ohio Application August 19, 1930. Serial No. 476,355

9 Claims. (Cl. 254—89)

Plunger-elevated platforms for raising automobiles for greasing or repairs have become very popular. Heretofore it has been customary to chock the wheels of the automobile manually to prevent its inadvertent rolling off of the platform, but occasionally the attendant forgets to properly chock the machine, and as the result, cars sometimes are accidentally rolled off of the platform, with consequent damage.

The primary object of the present invention is to provide a chocking device operating automatically, consequent upon the raising of the platform, thereby insuring the vehicle being retained on the platform.

A subordinate object is to arrange the chocking device so that it will be swung into position toward the wheel rather than in the opposite direction, whereby the full space of the platform is available for the automobile, and the platform can be made shorter than if extra space had to be provided for the chocking device.

My platform provides a pair of trackways suitably supported on top of the plunger. Each of these trackways has at its end a hinged ramp adapted to rest at its free edge on the ground when the platform is in its lowered position, thus enabling easy access to the platform though it stands at a short distance (somewhat variable) above the ground. I have so devised my automatic chocking devices that they are operated by the angular change in the position of these ramps as soon as the platform has risen to any material degree, the chocking becoming effective before the free edge of the ramp leaves the ground. This particular operation is also included within my invention.

Other features of my invention will become apparent from the following detailed description of a preferred embodiment illustrated in the drawings.

In the drawings, Fig. 1 is a perspective of an elevating platform equipped with my automatic chockers, the same being shown in elevated position with an automobile mounted thereon; Fig. 2 is a plan of a portion of one of the platform trackways with the ramp and chocking device hinged thereto; Fig. 3 is a sectional side elevation of the end portion of a trackway and ramp and chocking devices in the normal lowered position, the chocking device being idle; Fig. 4 is a similar view of the same parts after the platform has risen a short distance and the chocking device has automatically come into active position; Figs. 5 and 6 are details in cross section on the correspondingly numbered lines on Fig. 3.

As shown in Fig. 1, 10 indicates a suitable plunger, 11 a cross head thereon, and 12 a pair of parallel vehicle trackways carried by the crosshead. Each trackway has a horizontal portion for receiving the wheels of the vehicle and an upstanding guide flange 13 at the inner edge.

To each end of each trackway 12 is hinged a suitable ramp 20, this ramp being mainly a flat plate but an upwardly extending guiding flange 21 along the inner edge, which preferably diverges inwardly from the platform flange 13. I have shown the pivoting as effected by a pintle or shaft 25 mounted in hinge ears 15 on the trackway and hinge ears 23 on the ramp.

I find it convenient to make the trackways of Z-bars carrying a horizontal portion 16, the flange 13 and a downward flange 17, and an angle bar having a horizontal portion 18 and a downward flange 19 welded or otherwise secured to the flange 17. This is the construction illustrated in Figs. 2 and 5.

It will be seen that with such a platform, when in its lowermost position, the ramps 20, as shown in Fig. 3, form an easy pathway and guiding means to the supporting trackway of the platform. Also, when the platform is raised, these ramps relatively swing downward by gravity about their hinge axis 25.

The chocking members in the preferred form of my invention comprise plates 30 hinged on the same shaft 25 as the ramps and adapted to stand flush with the ramp within an opening 27 thereof when the platform is lowered, as illustrated in Fig. 3. The plate 30 has a long tubular ear 31 (which may be a pipe welded to the plate) which embraces the shaft 25 between the platform ears 15. When in the lowered position, the free edge of the chocking plate 30 rests on a suitable projection 28 carried by the ramp on its underside and extending across the opening 27. This projection may readily be an angle clip, as shown in Figs. 2, 3, 4 and 6, welded or otherwise secured to the bottom of the ramp 20. This insures the chocker plate 30 forming a continuous flush portion of the ramp when the platform is in position for the car to pass on or off; thus no obstruction is provided by the chocker against the movement of the car.

To elevate the chocker plate automatically consequent upon the ascent of the platform, I provide a very simple system of linkage illustrated in Figs. 3, 4 and 5. Thus, I mount a rocking lever 40 on a suitable shaft carried by the platform. I connect this lever on one side of its pivot by a link 41 with an arm 32 welded or otherwise secured to the underside of the chocking plate 30. I connect the lever on the other side of its pivot by a link 42 with the ramp. The result is that as the ramp decreases its reentrant angle with the platform, consequent upon the raising of the platform, the ramp shoves on the link 42 and rocks the lever 40, which shoves on the link 41 and raises the chocking plate into active position, as shown in Fig. 4.

The shaft 45 carrying the lever 40 may readily be mounted in the combined flanges 17 and 19 of the platform and in the flange 46 of an angle clip welded or otherwise secured to the platform portion 18, the shaft being preferably held in these flanges by suitable cotter pins. The link 41 is bifurcated at its ends to extend onto opposite sides of the lever 40 and the arm 32 respectively, and may be pivoted thereto by suitable rods 47 and 48 held by cotter pins. The link 42 may be readily attached at its outer end to the ramp by being pivoted directly to the flange of the angle clip 28 which forms the support for the depressing chocker plate. At the other end the link is connected to the lever 40 by means of a pin 49 carried by the lever and an embracing slot 43 of the link. The lever 40 is preferably of the triangular form shown to provide an abutting surface 44, which may engage the underside of the platform member 18 and limit the relative downward movement of the ramp as the platform rises.

The slot 43 in the link 42 is for the purpose of preventing damage to the linkage in case the edge of the ramp meets any obstruction in coming into its lowermost position, as for example a stone or tool which might accidentally be left on the ground surface beneath the free edge of the ramp.

It will be seen that my device is extremely simple in construction; that it does not interfere in any way with the driving of the automobile onto or off of the lowered platform; that it comes into action automatically by the raising of the platform before the platform has been raised to a dangerous distance, and that when in action it is self locking. Furthermore, by swinging toward the automobile wheels, the construction does not require any enlargement of the necessary length of the platform, as any platform long enough to support the car may also carry my chocking devices. Incidentally, it may be stated that the plate of the chocking device can be made from the piece of metal cut out by forming the opening 27 in the ramp.

A further advantage of the present invention is the fact that by utilizing a chocking device, which is positioned at or near the end of the trackway, allowance is thereby made for shifting the device a slight distance along the trackway so as to turn the fitting on the universal joint to an accessible position in the event that it is obstructed by any of the parts of the vehicle.

Fig. 1 being a perspective view is somewhat foreshortened but it is intended to show the chocking devices, as being spaced sufficiently far apart to allow a limited movement for rendering all fittings accessible, and yet for preventing the vehicle from being rolled inadvertently off the lift. Normally, lifts of this character are sold on a definite load lifting capacity and the trackways are furnished in sufficient length to exceed the motor wheel base of a car that comes within the rated capacity of the lift. Thus, each trackway has sufficient length to permit the necessary degree of longitudinal movement of every car, which the lift is intended to support.

In the operation of my device, the parts stand in idle position as shown in Fig. 3, wherein X indicates the ground line. It will be seen that it is easy to drive the car up the ramp onto the platform, the chocker plate 30 forming a portion of the driving surface. Now, as the platform rises, the lower edge of the ramp 20 remains on the ground, as indicated by the line X in Fig. 4, but the raising of the upper end of the ramp causes it to swing toward the position shown in Fig. 4 and in such movement it shoves on the line 42, rocks the lever 40 and raises the chocker 30 into active position. This action takes place almost immediately after the platform has begun to rise.

As soon as the platform has moved upwardly a distance corresponding to the distance between the lines X and Y in Fig. 4, the ramp has swung into the position shown in that figure and has thereby rocked the lever 40 to the limit of its position, the surface 44 abutting the under side of the platform. In this position the pin 47 in the linkage connection to the chocker will be carried beyond the dead center; that is to say, the axis of the pin 47 will be below the plane connecting the axes of the shaft 45 and of the pin 48. The parts remain in this position in the subsequent elevation of the platform and the abutment 44 prevents the ramp dropping further.

It will be noticed particularly, that after the linkage connection to the chocker has moved past the dead center, it is impossible for any pressure on the chocker to raise the ramp. Thus the chocker is automatically locked against movement as soon as the platform has been elevated this preliminary distance.

I claim:

1. The combination of a platform, a ramp hinged to the end thereof and having a cut-out portion adjacent the hinge axis, a chocking plate hinged to the platform on the same axis and adapted to lie within the cut-out portion of the ramp with its top surface flush with the surface of the ramp in the lowered portion of the platform, and automatically acting mechanism for swinging the chocking device upwardly as the platform rises.

2. The combination of a platform, a ramp hinged to the end thereof by means of ears on the platform and on the ramp and a pintle shaft, said ramp having a cut-out portion adjacent the hinge axis, a chocking device formed of a plate mounted on the pintle shaft, means for supporting the free end of the chocking plate with the plate flush with the ramp in the lowered position of the platform, linkage mechanism connecting the chocking plate and ramp and adapted to raise the chocking plate when the ramp decreases its reentrant angle with the platform, such linkage mechanism including a lever pivotally mounted on a depending portion of the platform and links connecting it with depending portions of the chocking plate and ramp.

3. The combination of a platform, a ramp hinged thereto, a chocking device hinged to the platform, linkage mechanism including a rock lever on the platform connecting the ramp with the chocking device adapted to swing it upwardly when the platform rises due to the relative angular movement of the ramp, such linkage mechanism being adapted to move past the dead center, and the rock lever having a portion thereof bearing against the platform when the linkage mechanism is moved past the dead center, whereby pressure exerted against the chocking device in a direction that tends to lower it urges the rock lever into engagement with the platform and thereby automatically locks the chocking device.

4. The combination of a platform, a ramp hinged thereto, a chocking device hinged to the platform on the same axis as the ramp and adapted to occupy a position flush with the ramp surface in the lowered position of the platform, a rock lever pivotally carried by the platform, a link connecting the rock lever with the chocking device, means connecting the rock lever with the ramp, and a stop limiting the relative downward movement of the ramp at a point after the mutual pivot of the link and rock lever has passed beyond the dead center, whereby the chocking device is automatically locked.

5. The combination of a platform, a ramp hinged thereto, a chocking device pivotally mounted on said platform, a linkage mechanism connecting the ramp with the chocking device, including a rock lever, said rock lever having a shoulder adapted to engage the platform after the linkage connection to the chocking device has moved past the dead center, whereby pressure exerted against the chocking device in a direction that tends to lower it urges the rock lever into engagement with the platform and thereby automatically locks the chocking device.

6. The combination of a platform having a pair of trackways, each comprising a Z-bar and an angle bar with its flange secured to a downward flange of the Z-bar, a supporting shaft mounted in such flanges, a rocking lever mounted on the shaft, a ramp pivoted to the end of the platform and having a cut-out portion, a chocking plate mounted on the hinge axis of the ramp and adapted to occupy the cut-out portion when the platform is lowered, an arm secured to the underside of the chocking plate, a link connecting said arm with the rock lever on one side of its supporting shaft, and a link connecting the rock lever on the other side of its shaft with the ramp.

7. The combination of a platform, a ramp hinged to the end thereof by means of ears on the platform and on the ramp and a pintle shaft, said ramp having a cut-out portion adjacent the hinge axis, a chocking device formed of a plate having a long ear mounted on the pintle shaft between the platform ears, a member secured to the underside of the ramp and extending across the cut-out portion to support the free end of the chocking plate flush with the ramp in the lowered position of the platform, and mechanism connecting the chocking plate and ramp and adapted to raise the chocking plate when the ramp decreases its reentrant angle with the platform.

8. The combination with a vehicle lift having a trackway and a ramp thereon, of an automatically actuated chocking device therefor, said chocking device being adapted when the lift is lowered to form part of the ramp.

9. The combination with a vehicle lift having a trackway thereon, of a chocking device pivoted on said trackway on an axis transverse thereto and parallel to the surface thereof, gravity means for moving said chocking device into active position upon raising of the lift, means for automatically locking said device in the active position and means operative by engagement with the ground when the lift is lowered to release said locking device.

ROLLIN L. BACHER.